(12) United States Patent
Azuma et al.

(10) Patent No.: US 8,540,194 B2
(45) Date of Patent: Sep. 24, 2013

(54) PIPE SUPPORT BASE

(75) Inventors: Masatoshi Azuma, Tokyo (JP); Atsushi Hikoyama, Tokyo (JP)

(73) Assignee: Advance Co., Ltd., Tokyo (JP)

( * ) Notice: Subject to any disclaimer, the term of this patent is extended or adjusted under 35 U.S.C. 154(b) by 0 days.

(21) Appl. No.: 12/524,553

(22) PCT Filed: Jul. 8, 2009

(86) PCT No.: PCT/JP2009/003182
§ 371 (c)(1),
(2), (4) Date: Aug. 8, 2011

(87) PCT Pub. No.: WO2011/004432
PCT Pub. Date: Jan. 13, 2011

(65) Prior Publication Data
US 2012/0119037 A1 May 17, 2012

(51) Int. Cl.
*F16L 3/22* (2006.01)
(52) U.S. Cl.
USPC .............................. 248/68.1; 248/73; 52/503
(58) Field of Classification Search
USPC ............... 248/317, 339, 340, 74.2, 343, 68.1, 248/72, 73, 346.01, 346.5, 678, 680, 681; 52/167.9, 503, 504; D25/122, 123, 124, D25/125; D8/349, 382, 391, 395
See application file for complete search history.

(56) References Cited

U.S. PATENT DOCUMENTS

| | | | | |
|---|---|---|---|---|
| 4,044,428 A | * | 8/1977 | Kowalski | 24/16 R |
| D263,754 S | * | 4/1982 | Dallaire | D25/122 |
| D309,950 S | * | 8/1990 | Westphal et al. | D25/122 |
| 5,188,332 A | * | 2/1993 | Callas | 248/544 |
| D364,799 S | * | 12/1995 | Callas | D8/395 |
| 5,806,823 A | * | 9/1998 | Callas | 248/320 |
| 6,305,650 B1 | * | 10/2001 | Hawkins et al. | 248/68.1 |
| 6,679,461 B1 | * | 1/2004 | Hawkins | 248/74.2 |
| 7,735,270 B2 | * | 6/2010 | Olle et al. | 52/167.9 |
| 8,104,731 B2 | * | 1/2012 | Faucher et al. | 248/343 |
| 8,181,916 B2 | * | 5/2012 | Azuma et al. | 248/68.1 |
| 2011/0006177 A1 | * | 1/2011 | Wakura | 248/206.5 |

* cited by examiner

*Primary Examiner* — Tan Le
(74) *Attorney, Agent, or Firm* — Apex Juris, pllc; Tracy M. Heims

(57) ABSTRACT

To provide a pipe support base light in weight and with good workability, to which loads may given according to need. This problem may be overcome with a hollow cylindrical body with a rectangular cross section and with four sides. A through passage is provided in the center portion thereof. Further, a cross-shaped rib is provided at an approximately central position thereof. Additionally, grooves are formed parallel to the aforementioned through passage on at least any of the surfaces, upon the edges of which are provided engagement plates protruding into the cross sections of the grooves.

3 Claims, 6 Drawing Sheets

PIPE SUPPORT BASE

CROSS-REFERENCE TO RELATED APPLICATION(S) AND CLAIM OF PRIORITY

This is a National Phase Application in the United States of International Application No. PCT/JP2009/003182 filed on Jul. 8, 2009. The entire disclosure of the above patent application is incorporated herein by reference.

FIELD OF INVENTION

This invention relates to a mounting for supporting various types of piping installed on building roofs or the like.

BACKGROUND OF THE INVENTION

Water supply tanks are normally arranged with cooling-heating devices on building roofs. In order to supply water and/or gas to the inside of a building from such tanks and devices, piping must be installed upon the roofs of these buildings.

This piping is lifted a specific distance from the surface of a roof and is not fixed directly to the roof out of consideration for waterproofing. As such, structures have generally been used in which piping is supported by wood blocks, concrete blocks, or steel columns serving as a mounting.

The above-cited conventional pipe support base has the following problems.

(1) Structures in which piping is fixed to wood blocks are both inexpensive and easy to set up. However, wind, rain, and sunlight cause the wood to corrode and the bolts to be lost, thereby potentially causing the piping to lose its fixture to the wooden base.

(2) With methods for producing mountings by mixing concrete and filling the interior of mold forms with that concrete, mountings which conform to actual conditions can be installed, but such methods take much time and effort.

(3) There are also certain methods in which pipe mountings are constructed together with roof waterproofing as a single unit. With such methods, renovation of roof waterproofing requires cumbersome work such as spreading out sheets of material and covering the periphery of the mounting and, further, this waterproofing may be incomplete as a result.

[Patent Document 1] Japanese Unexamined Patent Application No. 2002-130539.

SUMMARY OF THE INVENTION

In order to solve the above-described problems, the pipe support base of the present invention is a pipe support base that is a hollow cylindrical body with a rectangular cross section and with four sides, provided with a through passage penetrating the inner portion of the aforementioned hollow cylindrical body, a cross-shaped rib positioned at an approximately central portion, grooves formed parallel to the aforementioned through passage on at least any of the surfaces, and engagement plates provided on the edges of the aforementioned grooves and protruding into the cross sections of the aforementioned grooves.

Furthermore, this pipe support base is further characterized in that a weight plate is laid beneath the pipe support base, wherein the area of this weight plate is larger than the area of one side of the support base, and a nail plate is set up to protrude into that surface, wherein the aforementioned nail plate provided in dimensions and in a position allowing it to be inserted into the through hole of the pipe support base.

Moreover, this pipe support base is further provided with a weight adjusting block having a shape similar to the inner shape of the aforementioned through passage.

Additionally, this pipe support base is further characterized in that the aforementioned engagement plates protruding into the cross sections of the grooves formed parallel to the through passage on any side of the pipe support base are capable of being deformed until they support pipe P in a line from below as a result of the tightening of pipe fasteners inserted into the inner portions of the grooves.

The pipe support base of the present invention, having been configured as explained above, produces the following effects.

The pipe support base is a hollow cylindrical body and, as such, is light in weight and allows for easy handling, thus minimizing construction costs.

When a user wishes to give the lightweight support base a load for wind resistance, this can be accomplished by inserting a weight-giving block into a hollow channel and/or installing the support base to a weight plate having an area larger than the surface area of the support base.

In this way, the support base is only installed to the surface of a roof, thus obviating work such as rooftop surface processing and, as a result, completely preventing damage to roof waterproofing.

With buildings, renovation of roof waterproofing is required at a certain point in time after construction is complete. Even upon renovation, the support base of the present invention does not require roof surface processing as it is simply placed on the surface of a roof. As such, the support base can be easily moved or removed without interfering with waterproofing.

By forming a plurality of grooves on a single support base, grooves conforming to commercially-available pipe fastener specifications can be selected from this plurality of grooves and the corresponding surface can be used by facing it upward. As such, a variety of types of fasteners can be made to correspond with a single support base, making the inventive pipe support base very economical.

BRIEF DESCRIPTION OF THE DRAWINGS

The above and other objects of the present invention will become readily apparent by reference to the following detailed description when considered in conjunction with the accompanying drawings wherein.

DETAILED DESCRIPTION OF THE PREFERRED EMBODIMENT

Figure 1:
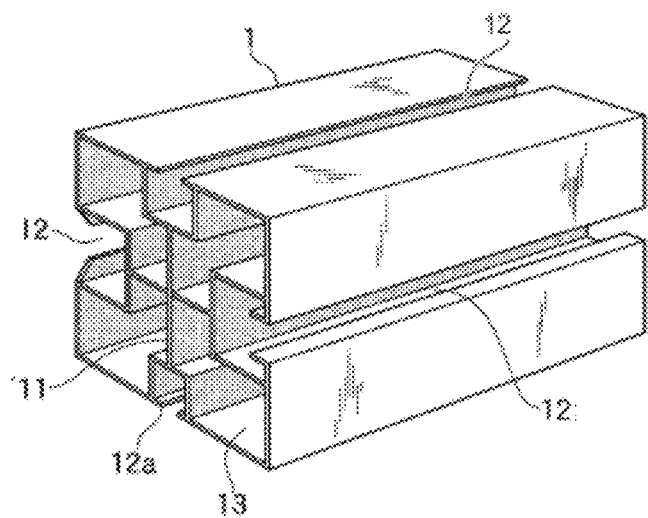
FIG. 1 is an explanatory diagram of the pipe support base of the present invention.
Figure 2:
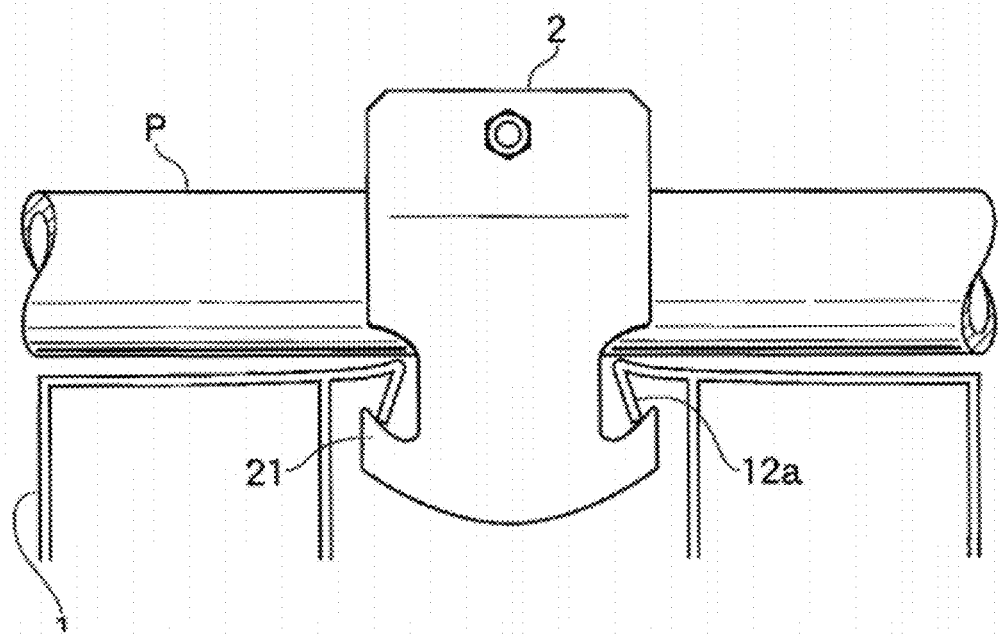
FIG. 2 is an explanatory diagram of the pipe support base of the embodiment.
Figure 3:
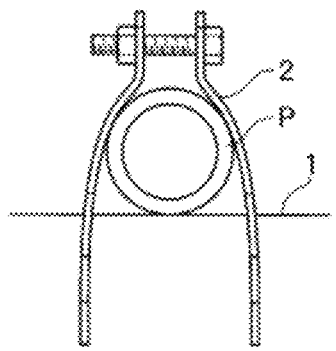
FIG. 3 is an explanatory diagram of the pipe support base of the embodiment.
Figure 4:
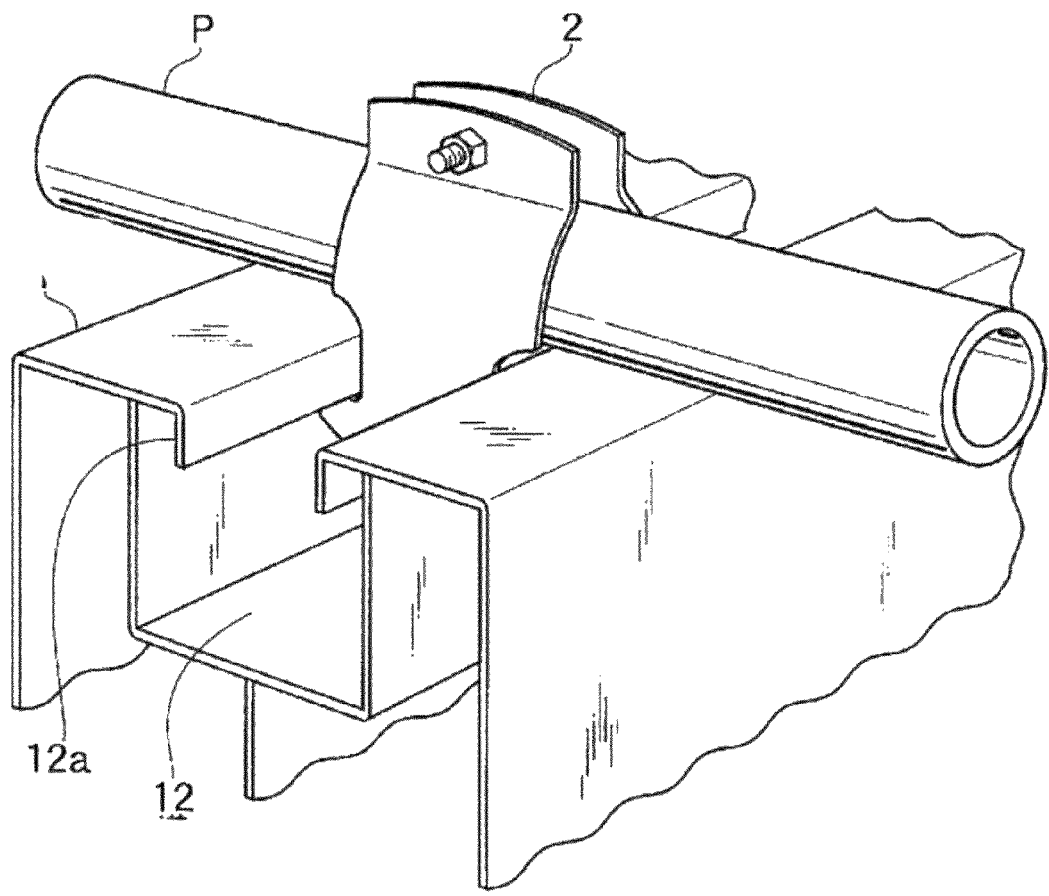
FIG. 4 is an explanatory diagram of the pipe support base of the embodiment.
Figure 5:
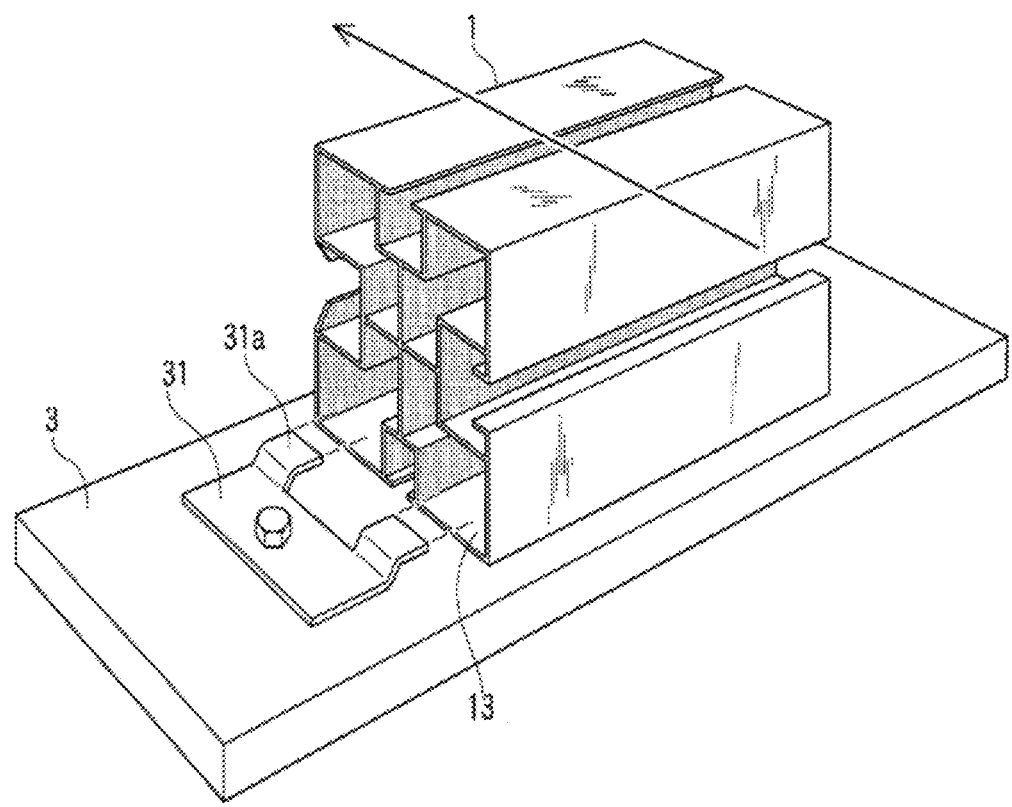
FIG. 5 is an explanatory diagram of the pipe support base of the embodiment.
Figure 6:
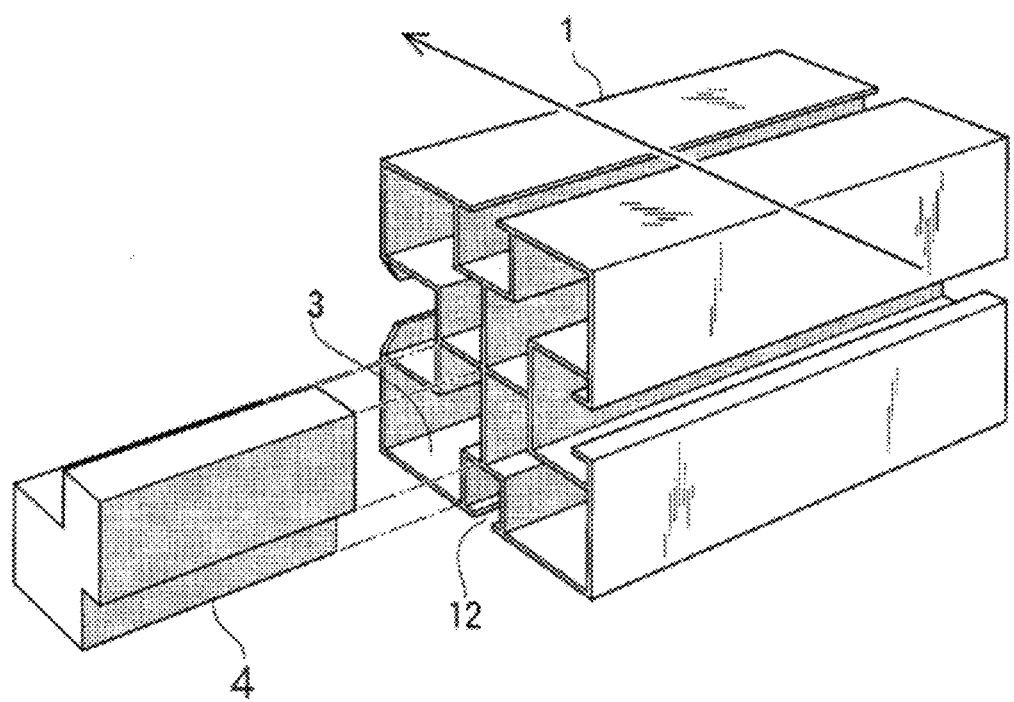
FIG. 6 is an explanatory diagram of pipe support base 1 of the embodiment.

The preferred embodiments of the present invention will hereafter be explained in reference to the drawings.

(1) Support Base

The structure of support 1 will first be explained.

(1-1) Basic Shape

The basic shape of pipe support base 1 supporting pipe P is a cross section enclosed by a rectangular hollow cylindrical body. This cylindrical body material is a lightweight material constituted of a synthetic such as ABS resin or AES resin or constituted of thin steel plates. A cross-shaped rib 11 is provided in the approximate center of the cylindrical body. As a result, a plurality of penetrating passages are formed in the interior of the cylindrical body.

(1-2) Grooves

A groove 12 parallel to a through passage 13 is formed on any surface of the rectangular cylindrical body constituting pipe support base 1. An engagement plate 12a projecting in an eave shape toward the inside the cross section of groove 12 is then formed on the edge of groove 12. This engagement plate 12a is mounted by means of a pipe fastener 2 described below. Engagement plate 12a may be a simple eave-shaped plate, or it may be an L-shaped member with a cross section bending toward the interior. In the case that groove 12 is formed in a plurality of areas on support base 1, the dimensions of the grooves are made consistent with the specifications of a variety of different commercially-available pipe fasteners 2. By doing so, grooves conforming to pipe fastener 2 specifications can be selected from a plurality of grooves 12 in a single support base 1 and the corresponding surface can be used by facing it upward. As such, a variety of types of fasteners can be made to correspond with a single support base, making the inventive pipe support base very economical.

(2) Pipe Fasteners

A pipe P is fastened to support base 1 of the present invention by means of a pipe fastener 2. This pipe fastener 2 is a product which is already available commercially and is constituted by a combination of two semicircular plates or by a bolt. As shown in the drawings, the semicircular plates are rectangular thin plates partially formed with curved portions. Then, when these two semicircular plates are combined to sandwich pipe P, the curved portions thereof are brought into contact with the upper portion of pipe P. When these two semicircular plates are in the combined position, the portions of the semicircular plates above the curved portions are brought closer together than the portions below the curved portions, and these proximal portions are fastened together by a bolt placed through these two proximal portions.

(3) Relationship Between Grooves and Pipe Fasteners

The cross-sectional width of groove 12 is consistent with the dimensions of commercially-available pipe fastener 2. In the case that pipe fastener 2 is a semicircular plate with certain specifications, the width of the portion above its curved portion is constituted to be wider than the width of groove 12. The width of the portion below the curved portion is constituted to be narrower than the width of groove 12. The lowermost part is formed with a part expanding toward the side surface, the upper end of both ends of this expanding part protruding upwards to form hooks 21. These hooks 21 engage with the inside of engagement plate 12a which protrudes inwardly from both sides of groove 12. In the case that pipe fastener 2 is a bolt, the width of groove 12 is constituted to be approximately equal to the width of a bolt head part with certain specifications. As such, when the bolt head part is slid from the open side of groove 12 to the interior thereof, this bolt head part will be restrained by both wall surfaces of both sides of groove 12, thus preventing rotation. Therefore, by making the widths of the plurality of grooves 12 formed on support base 1 of the present invention consistent with the specifications of various types of bolt head parts, pipe P can be fixed through the use of various types of bolts. On the other hand, by making one of the plurality of grooves 12 consistent with the specifications of a semicircular plate and then making another groove 12 consistent with the specification of a bolt, a plurality of pipe fasteners 2 can be installed with a single support base 1.

(4) Weight Plate

The pipe support base 1 of the present invention is characterized in that it is itself light in weight. However, it may also be necessary to consider the addition of weight due to building environment, the way in which pipe P is laid, any other such requirements. In this case, it is possible to combine support base 1 with a weight plate 3. Weight plate 3 is a flat plate made of concrete and which is laid below support base 1. The area of weight plate 3 is formed to be larger than the area of one side of pipe support base 1. Additionally, a nail plate 31 is set up to protrude into the surface of weight plate 3. This nail plate 31 is a metal fixing member is installed with dimensions and in a position allowing it to be inserted into through passage 13 of pipe support base 1. Nail plate 31 can be produced by integrally embedding it into the concrete weight plate 3, or can also be installed by a bolt in a nut hole formed on weight plate 3. Support base 1 can be fixed onto weight plate 3 by inserting nail plate 31 into through passage 13 from both sides while it sandwiches support base 1 placed upon weight plate 3. Forming the length of weight plate 3 into a long rectangular plate running in a direction intersecting the direction in which pipe P is laid serves to make pipe P largely resistant to wind.

(5) Load Blocks

Furthermore, the pipe support base 1 of the present invention can be combined with a load block 4. This load block 4 is a concrete weight body which is similar to the inner shape of through passage 13. By inserting this weight body into through passage 13 of support base 1, weight can be added to support base 1, which is originally light in weight. By making the inner shape of through passage 13 uniform to the furthest extent to possible, even just a few types of load blocks 4 will suffice.

(6) Deformation of the Engagement Plate

As is described above, there is an engagement plate 12a protruding like an eave of a roof into the cross section of groove 12 formed parallel with through passage 13. In the case that this engagement plate 12a is, in particular, an L-shaped cross section, hook 21 of pipe fastener 2 will push up engagement plate 12a from below when the bolt of pipe fastener 2 installing pipe P is tightened. Then, because the cross section of support base 1 is formed by a relatively thin synthetic resin or a thin steel plate, the tightening of engagement plate 12a exerts deformation in that hook 21 is pushed upwards. As a result, the end face of engagement plate 12a supports pipe P is supported in a line from beneath pipe P. As such, pipe P and support base 1 are brought into contact in such that they are slightly biting into one another by means of the end face of engagement plate 12a, thus maintaining a strong fixture.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

REFERENCE TO THE NUMERALS

1 Support base
11 Rib
12 Groove
12a Engagement plate
13 Through passage
2 Pipe fastener
21 Hook 3 Weight plate
31 Nail plate
4 Load block
P Pipe P

What we claim is:

1. A pipe support base, comprising:
   a hollow body with a rectangular cross section having four sides;
   a through passage penetrating an inner portion of said hollow body;
   a cross-shaped rib positioned at an approximately central portion;
   grooves formed parallel to said through passage on at least any one of surfaces; and
   engagement plates provided on edges of said grooves and protruding into cross sections of said grooves;
   further comprising a weight plate laid beneath said pipe support base,
   wherein an area of said weight plate is larger than an area of one side of said support base,
   a nail plate is set up to protrude into said surface, and
   said nail plate is provided in dimensions and in a position allowing it to be inserted into said through passage of the pipe support base.

2. The pipe support base of claim 1,
   further comprising a weight adjusting block having a shape similar to an inner shape of said through passage.

3. The pipe support base of claim 1,
   wherein said engagement plates protruding into the cross sections of the grooves formed parallel to the through passage on any side of the pipe support base are deformed when said pipe fasteners are tightened around a pipe as a result of the tightening of said pipe fasteners inserted into the inner portions of the grooves.

* * * * *